F. W. RADELL.
DRIVING OR POWER TRANSMISSION BELT.
APPLICATION FILED DEC. 27, 1919.

1,378,379.

Patented May 17, 1921.

INVENTOR:
Frederick W. Radell.
BY Diedersheim + Fairbanks
ATTORNEYS

UNITED STATES PATENT OFFICE.

FREDERICK W. RADELL, OF GLENSIDE, PENNSYLVANIA.

DRIVING OR POWER TRANSMISSION BELT.

1,378,379.

Specification of Letters Patent. Patented May 17, 1921.

Application filed December 27, 1919. Serial No. 347,766.

*To all whom it may concern:*

Be it known that I, FREDERICK W. RADELL, a citizen of the United States, residing at Glenside, county of Montgomery, State of Pennsylvania, have invented a new and useful Driving or Power-Transmission Belt, of which the following is a specification.

My invention consists of a driving or power transmission belt in which there is a facing of cork or similar material and a belt proper, and novel means on said belt and facing for connecting the latter with the former, the advantages thereof being hereinafter described.

The invention is satisfactorily illustrated in the accompanying drawing, but the important instrumentalities thereof may be varied, and so it is to be understood that the invention is not limited to the specific details shown and described, as long as they are within the spirit or scope of the claims.

Similar numerals of reference indicate corresponding parts in the figures.

Figure 1:
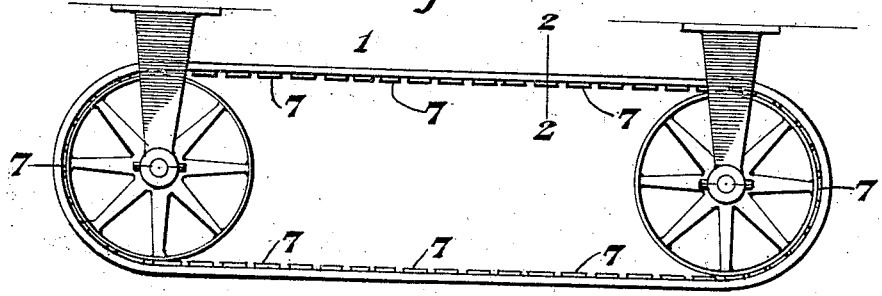
Figure 1 represents a side elevation of a driving belt embodying my invention.

Referring to the drawings.

Figure 4:
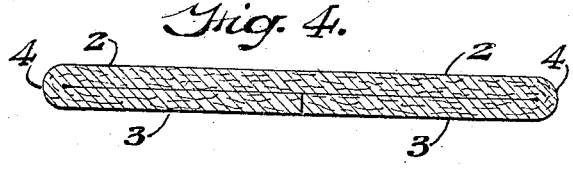
Fig. 4 represents a transverse section of the belt proper in condition prior to being converted into the belt embodying my invention.

1 designates the driving belt proper which is formed of a piece of canvas, leather or other suitable pliable material, said piece being doubled on itself forming a plurality of folds or plies 2 and 3 as shown in Fig. 4. The end portions 4 of the doubled folds are inturned below forming on the inner sides of the belt the flanges 5 which extend toward each other, and leaving between said flanges and the adjacent opposite portions of the wall of the belt proper the channels 6.

Figure 2:
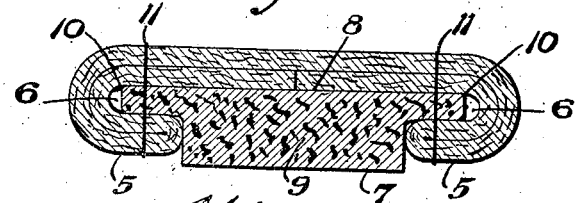
Fig. 2 represents a transverse section on an enlarged scale on line 2—2 Fig. 1.
Figure 3:
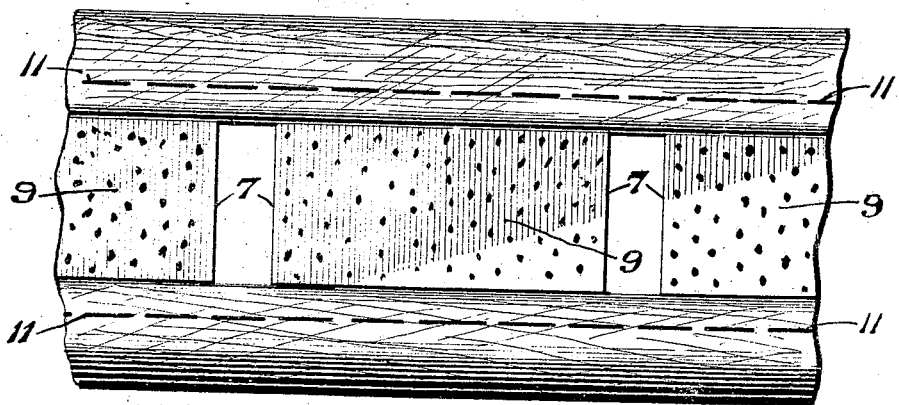
Fig. 3 represents a view of a portion of the inner side thereof.

7 designates blocks of cork which are adapted at intervals to form the facing of the belt proper and contact with the pulleys, rollers, drums or the like around which the belt is passed, said blocks having their heads 8 rested against and supported on the inner wall of the belt proper and their bodies 9 occupying positions between the flanges 5 and projecting to some extent inwardly therefrom, as most plainly shown in Fig. 2.

On the heads of the blocks are the outturned flanges 10 which are adapted to enter the channels 6 of the belt proper and to be embraced by the inner walls of the flanges 5 and the adjacent portions of the inner wall of the belt proper opposite thereto, thus connecting the blocks with the belt proper and sustaining them on said flanges 5. Passed through the flanges 5 of the belt proper, the flanges 10, and the adjacent portions of the folds of the belt proper are the stitches 11, but rivets may be employed in lieu thereof by which provision the blocks are firmly secured to the belt proper while preserving the flexibility of the latter. The blocks are of a frictional nature and will take firm hold of the pulley, etc., without liability to slip thereon, and they are soft, pliable and strong and will not absorb oil and become greasy, while the belt proper is removed from contact with the pulleys, etc.

The doubled walls of the belt proper throughout thicken the same and add strength and durability thereto, and so increase the wearing qualities and life of the belt proper.

Having thus described my invention what I claim as new and desire to secure by Letters Patent, is:—

1. In a power transmission belt, a belt proper having inturned flanges forming channels within the same at opposite sides, and a bearing surface of cork having its ends received and retained within said channels with its acting face extended between the adjacent ends of said flanges.

2. In a power transmission belt, a belt proper composed of a length of material doubled on itself, and inturned to form side flanges which project toward each other, and which are spaced from the body of the belt to form channels between said flanges and the opposite inner wall of the belt and inserts of cork in said channels.

3. In a power transmission belt, a facing for the belt proper consisting of a block of cork having outturned flanges which flanges are adapted to be embraced by opposite members of said belt proper and are secured thereto with the body portion of the block projecting beyond and engaged by said members.

4. In a power transmission belt, a belt proper composed of a length of material doubled on itself, and inturned to form side flanges which project toward each other, and which are spaced from the body of the belt to form channels between said flanges and the opposite inner wall of the belt, and a facing block which is formed with outturned flanges adapted to occupy said channels and its body to be fitted between said flanges of the belt proper, and means for securing said flanges of the block to said flanges of the belt proper and the opposite adjacent portions of the latter.

FREDERICK W. RADELL.

Witnesses:
JOHN A. WIEDERSHEIM,
N. BUSSINGER.